3,170,785
REMOVAL OF ADSORBED HYDROGEN FROM PYROPHORICALLY PARTICULATE MATERIALS
Lawrence R. Phillips, Oak Ridge, Tenn., assignor, by mesne assignments, to the United States of America as represented by the United States Atomic Energy Commission
No Drawing. Filed Feb. 12, 1962, Ser. No. 172,810
2 Claims. (Cl. 75—.5)

The present invention relates to a treatment process conducted in vacuo on fine particulate materials. More specifically the present process relates to treatment, in vacuo, of particulate materials of such a fineness as to be pyrophoric in nature upon exposure to air.

The term "pyrophoric" as used herein is defined to mean exothermic oxidation of particulate materials to such an extent and at such a rapid rate as to heat the powders at least until they present a glow visible to the naked eye and up to and including exothermic oxidation to such an extent that an explosion occurs. Any attempt to define quantitatively in a generic manner the particle size at which powders or fine particles per se become pyrophoric, within the meaning of that term as used herein, is extremely difficult and in fact can be considered practically impossible. Accordingly, the phrase "pyrophorically particulate" is used herein to define particles which are of such minute size and high surface area that they will, upon exposure to the atmosphere at approximately room temperature, by pyrophoric within the meaning of the terms "pyrophoric" as used hereinabove. In general, tungsten powder having a surface area above about 3 to 5 square meters per gram and containing adsorbed hydrogen are pyrophoric and cannot be exposed to the atmosphere at room temperature without experiencing rapid oxidation to such an extent that the powder actually glows red and burns up vitrually completely by oxidation. Of course, such powder has no utility in powder metallurgical operations.

Several methods have been suggested for reducing pyrophoricity in particulate materials. They include deliberate, partial and controlled surface oxidation to provide a protective oxide coating on the particles. This method, while it may be satisfactory with some ceramic powders like $UO_2$, is completely unsatisfactory for metallic powders in general. Any oxidation of metallic powders must be kept to an absolute minimum if they are to be satisfactorily utilized in powder metallurgical processes. Another approach has been to prevent the particle size from being reduced to the point that pyrophoricity is experienced. This, of course, requires that the most desirable range of powder sizes for powder metallurgical use, i.e., the finest sizes, be excluded. Another and closely analgous method is to partially agglomerate the powders before exposure to air, this again defeats the prime intent in powder metallurgy processes to obtain and utilize very fine powders.

It is an object of the present invention to provide a method of reducing the pyrophoricity of particulate materials, having adsorbed hydrogen on their outer periphery, to a point where they can be readily handled at room temperature in air without undergoing exothermic oxidation to the extent that they exhibit a glow or actually burn rapidly or explode.

It is a further object of the present invention to provide a method for removing adsorbed hydrogen from the outer periphery of pyrophorically particulate tungsten (i.e., tungsten powder having a surface area greater than about 3 to about 5 square centimeters per gram) produced by hydrogen reduction of oxidic tungsten powders; the pyrophoricity of such particulate tungsten being reduced to such an extent as to enable an artisan to handle the powders exposed to air at room temperature without the powder suffering detrimentally from oxidation.

The invention achieving the aforementioned objects comprises subjecting pyrophorically particulate materials to a vacuum treatment at a pressure less than about 10 microns for a period of time sufficient to remove adsorbed hydrogen from the outer periphery of the particulate materials to prevent them from being pyrophoric in air at about room tempeature.

The effect of adsorbed hydrogen is thought to be that similar to a "fuse" that is, it is thought that the adsorbed hydrogen on the outer periphery of the particles reacts with oxygen in the surrounding atmosphere. This reaction being exothermic provides the heat which leads to explosive or at least rapid oxidation of the particulate material itself.

There are several variables in the present process which dictate whether or not the adsorbed hydrogen is removed at least to a sufficient extent to prevent the "fuse" effect or possibly substantially complete removal of adsorbed hydrogen. They are the vacuum pressure, time and temperature of treatment.

The pressure during the vacuum treatment is desirably maintained as low as equipment limitations permit, both from the standpoint of the vacuum container and the pumps used to evacuate the containers. Preferably a vacuum of less than about 10 microns of Hg is most desirable.

The time of vacuum treatment may be extended as long as desired although it has been found that tungsten powders of surface area greater than about 3 to about 5 square meters per gram can be handled in air at room temperature after about one to two hours of treatment in vacuo.

The temperature may be varied up to the sintering point of the powders themselves. That is, if it were possible to maintain a near perfect vacuum, the adsorbed hydrogen would be removed more rapidly at higher temperatures. Although this phenomenon is theoretically correct, it is not the sole consideration in commercial processing of powders. For example, tungsten powder is produced by hydrogen reduction of oxidic tungsten particles at levated temperature. It is very difficult to maintain a high vacuum on a furnace at a high temperature, especially from the structural standpoint of the furnace. In addition, and probably more important, any small amount of tramp oxygen or other impurity will readily react with the newly produced hot tungsten or other powders. Accordingly, it is very much preferred to reduce the temperature in the furnace or reaction container under a protective reducing hydrogen atmosphere. Then after the temperature has been reduced to a level where the rate of reaction between the tungsten and oxygen is low, room temperature or lower, the vacuum is applied for a period of time sufficient to remove the adsorbed hydrogen from the outer periphery of the particulate material.

By way of illustrating the present process, the following general example is presented. This illustration exemplifies the persent process as practiced in a multitude of runs on pilot plant scale.

Ten to twenty pound lots of hot tungsten powder having a surface area ranging from about 3 to about 6 square meters per gram were removed from a continuously operated hydrogen reduction process treating particulate tungsten trioxide as a starting material. The lots were removed in evacuable containers and allowed to cool to approximately room temperature. The evacuable containers were then connected to a vacuum pump and the pressure within the container was reduced to less than about 10 microns of Hg and maintained at that pressure for about one hour. The vacuum was then released and the powder exposed to air. The powder could be handled in air at room temperature for extended periods of time without rapid oxidation.

Tungsten powders removed from the same process without being treated by the process of the present invention burned rapidly upon exposure to air even though they were exposed to air only after being cooled to room temperature.

While the foregoing disclosure of the present invention has largely been accomplished specifically with reference to tungsten powders, it is contemplated that any particulate materials, rendered pyrophoric by the presence of adsorbed hydrogen on the outer periphery of the particles, can be rendered non-pyrophoric within the meaning of that term as defined hereinabove. Other materials include uranium dioxide, molybdenum, iron, nickel and rhenium.

What I claim is:

1. A process for reducing the pyrophoricity of tungsten particles having a surface area of greater than about 3 square meters per gram and which have hydrogen adsorbed on the surface thereof, said process comprising subjecting said particles to a vacuum of less than about 10 microns of mercury at a temperature below the sintering temperature of said particles and subsequently removing said particles from said vacuum and recovering said particles as non pyrophoric material having a surface area of greater than 3 square meters per gram.

2. The process of claim 1 wherein the particles are subjected to a vacuum of less than 10 microns of mercury at room temperature for a period of at least one hour.

References Cited in the file of this patent

UNITED STATES PATENTS

| | | |
|---|---|---|
| 2,326,631 | Fischer | Aug. 10, 1943 |
| 2,564,498 | Nisbet | Aug. 14, 1951 |
| 2,873,108 | Magel | Feb. 10, 1959 |
| 2,905,547 | Yoblin | Sept. 22, 1959 |